United States Patent

Wilkinson

[11] Patent Number: 5,920,652
[45] Date of Patent: Jul. 6, 1999

[54] METHOD AND APPARATUS FOR DIVIDING AN INPUT IMAGE INTO A PLURALITY OF IMAGES OF DIFFERENT FREQUENCY BANDWIDTHS

[75] Inventor: James Hedley Wilkinson, Tadley, United Kingdom

[73] Assignees: Sony Corporation, Tokyo, Japan; Sony United Kingdom Limited, Weybridge, United Kingdom

[21] Appl. No.: 08/816,153

[22] Filed: Mar. 12, 1997

[30] Foreign Application Priority Data

Mar. 20, 1996 [GB] United Kingdom ............... 9605870

[51] Int. Cl.$^6$ ..................................................... G06K 9/40
[52] U.S. Cl. .......................... 382/260; 382/275; 248/606
[58] Field of Search ................................. 382/260, 264, 382/261, 238, 239, 275; 348/607, 606, 619, 622, 623, 609, 610, 624, 625

[56] References Cited

U.S. PATENT DOCUMENTS 5,343,309  8/1994  Roetling ................................. 358/455
5,384,869  1/1995  Wilkinson et al. ..................... 382/240

FOREIGN PATENT DOCUMENTS 2 209 448  5/1989  United Kingdom .

*Primary Examiner*—Amella Au
*Assistant Examiner*—Vikkram Bali
*Attorney, Agent, or Firm*—Frommer Lawrence & Haug, LLP; William S. Frommer; Dennis M. Smid

[57] ABSTRACT

A method and apparatus for processing an input image by converting an input frame of a predetermined number of pixels into a plurality of output frames, the spatial frequency spectrum of each of said plurality of output frames being that of a respective predetermined frequency band of the spatial frequency spectrum of the input frame, the processing including filtering the input frame in one direction so as to produce a first output frame of said predetermined number of pixels, the first output frame having only one of the high spatial frequencies and the low spatial frequencies of said input frame in said one direction, and subtracting said first output frame from said input frame so as to produce a second output frame of said predetermined number of pixels, the second output frame having the other of the high spatial frequencies and the low spatial frequencies of said input signal in said one direction.

13 Claims, 6 Drawing Sheets

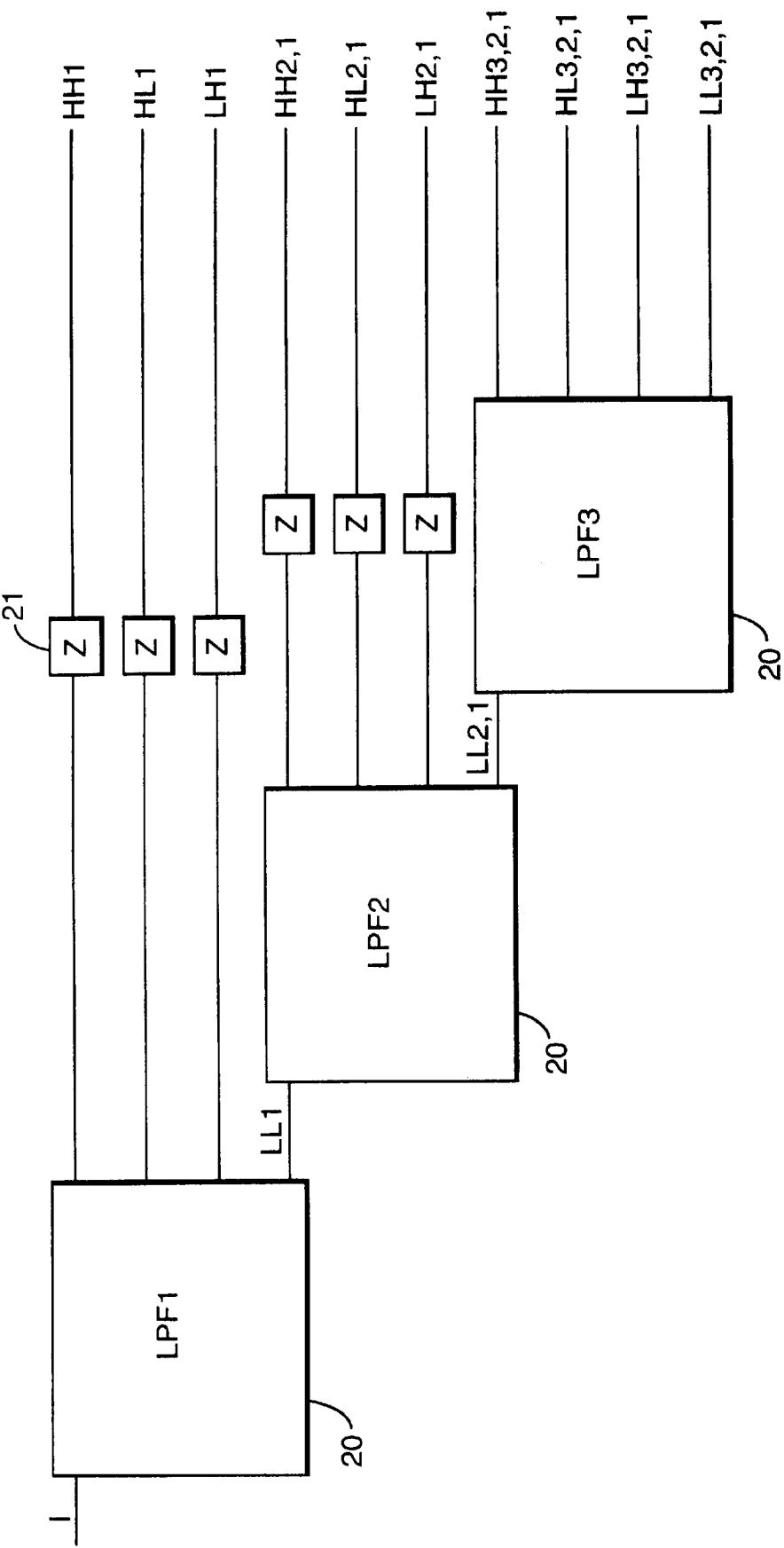

Fig.8.
LL3,2,1 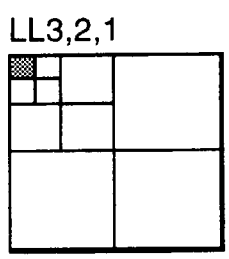
LH3,2,1 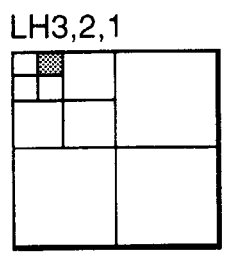
LH2,1 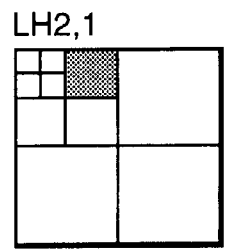
LH1 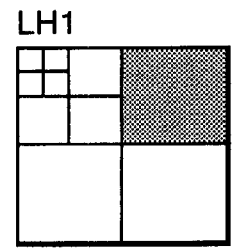
HL3,2,1 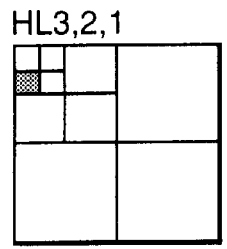
HL2,1 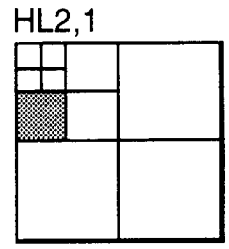
HL1 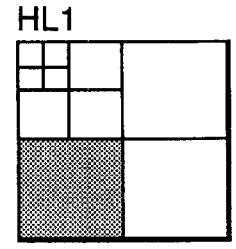
HH3,2,1 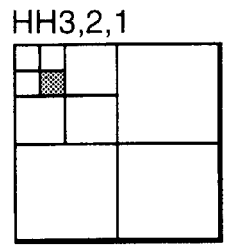
HH2,1 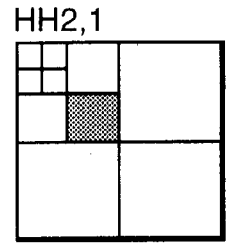
HH1 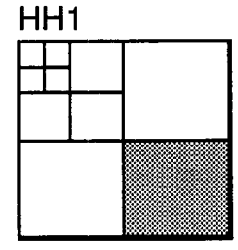

METHOD AND APPARATUS FOR DIVIDING AN INPUT IMAGE INTO A PLURALITY OF IMAGES OF DIFFERENT FREQUENCY BANDWIDTHS

BACKGROUND OF THE INVENTION

1. Field of the Invention

The present invention relates to a method and apparatus for dividing an input image into a plurality of images of different frequency bandwidths. More particularly, it relates to a method and apparatus for converting an input frame of image data into a plurality of output frames of image data, the spatial frequency spectrum of each of said plurality of output frames being that of a respective predetermined frequency band of the spatial frequency spectrum of the input frame.

2. Description of the Related Art

It is useful for various processing and transmission techniques to divide an input image into a number of component images each representing a part of the spatial frequency spectrum of the original image. In other words, by converting an input image into a number of component images, each containing the data for only a predetermined bandwidth, and by processing one or more of the component images and then reconstructing an image by summing together all of the component images, the input image can be processed selectively in each of its various bandwidths.

Since it is believed that the human eye has a logarithmic response over the frequency spectrum, it is possible to use a logarithmic array of bandwidths and FIG. 1 of the accompanying drawings illustrates an input frame divided in this manner.

According to FIG. 1, an input frame of data is converted into an output frame which is divided logarithmically into regions of different spatial frequency. With this logarithmic division, the "DC band" (which is a bandwidth starting at zero frequency) has a bandwidth of approximately ⅛th of the source bandwidth in both the horizontal and vertical directions and therefore in each of those directions uses ⅛th of the pixels used in the original source input frame. The bands marked 1 to 9 are AC components of which bands 1, 4 and 7 contain mostly vertically line structures, bands 2, 5 and 8 contain mostly horizontal line structures and bands 3, 6 and 9 contain mostly diagonal line structures.

In practice, an image divided according to FIG. 1 would show a simplified version of the image in the "DC band" area using only ¹⁄₆₄th of the number of pixels. The AC band areas would show separately the additional detail using more pixels (¹⁄₁₆th and ¼of the number of pixels of the source input image). By adding the higher frequency information of the AC bands to the "DC band", additional detail is added to the simplified image until, with all of the bands added together, the input image is recovered entirely.

FIG. 2 of the accompanying drawings illustrates an apparatus for dividing an input signal into high and low frequency components and then re-combining those components to reform the input signal. This process uses a special filtering arrangement known as a quadrative mirror filter (QMF) bank having the special property of being able to reproduce the output signal as a perfect replica of the input signal. This process of division may be applied to an input image over a number of stages so as to further divide the input image into the frequency bands described with reference to FIG. 1.

As illustrated in FIG. 2, the input signal is simultaneously low pass and high pass filtered and then decimated by removing every other pixel value. Thus, as an example, an input frame could be divided into two halves, each half having half the number of horizontal pixels, one half having the lower half of the frequency spectrum of the input frame and the other half having the higher half.

In reconstruction, the decimated signals are interpolated by first interleaving zero values with the decimated data and then low or high pass filtering the data to reconstruct the interleaved data. The two filtered signals are then summed to reconstruct the original input frame.

FIG. 3 of the accompanying drawings illustrates the frequency spectrum at the various stages of processing of FIG. 2. As illustrated, the decimation process introduces some unwanted alias frequencies and the interpolation mirrors these alias frequencies. However, where the filter banks are designed correctly as a QMF bank, by the following low and high pass filtering and subsequent addition, the unwanted alias frequencies cancel out so that the original input image is reproduced.

Unfortunately, if one of the decimated signals of FIGS. 2 and 3 is further filtered in some way, the symmetry between the aliasing noise of the low and high frequency bands is lost and asymmetric distortion is introduced into the final recombined signal. The problem of asymmetry lies in the process of sub-sampling, since the filters used for decimation are of linear phase.

FIGS. 4a and 4b of the accompanying drawings illustrate the signals created by a 3-stage dimensional wavelet transform from an input square wave with a sampling pitch which is misaligned with the sample decimation structure in order to exercise all sub-sampling phases. The filter bank is constructed from a sequence of QMF filter banks of the type illustrated in FIG. 2. Thus, these figures show a square wave with a pitch ensuring eight different edge faces for odd-tap and even-tap decimation filters respectively.

Both FIG. 4a and FIG. 4b show that the edges of the decimated wave forms have portions where the shape is asymmetric. When these AC component frequencies are subjected to gain changes or non-linear processing, then the effects feed back into the reconstructed signal with asymmetric results. Even-tap filters have no sampling offset in the decimation and reconstruction stages, but nevertheless still show edge distortions as in FIG. 4b.

OBJECT AND SUMMARY OF THE INVENTION

An object of the present invention is to divide an input frame into different spatial frequency bandwidths in such a way that the output frames may be recombined without introducing asymmetric distortion into the image.

According to the present invention there is provided a method of processing an input image by converting an input frame of a predetermined number of pixels into a plurality of output frames, the spatial frequency spectrum of each of said plurality of output frames being that of a respective predetermined frequency band of the spatial frequency spectrum of the input frame, the method comprising:

filtering the input frame in one direction so as to produce a first output frame of said predetermined number of pixels, the first output frame having only one of the high spatial frequencies and the low spatial frequencies of said input frame in said one direction;

subtracting said first output frame from said input frame so as to produce a second output frame of said predetermined number of pixels, the second output frame having the other of the high spatial frequencies and the low spatial frequencies of said input signal in said one direction;

filtering each of said first and second output frames in a direction perpendicular to said one direction so as to produce respectively third and fourth output frames of said predetermined number of pixels, the third and fourth output frames each having only one of the high spatial frequencies and the low spatial frequencies of said input frame in said perpendicular direction; and subtracting said third and fourth output frames from said first and second output frames respectively to produce fifth and sixth output frames of said predetermined number of pixels, the fifth and sixth output frames each having the other of the high spatial frequencies and the low spatial frequencies of said input signal in said perpendicular direction.

According to the present invention there is also provided an apparatus for processing an input image by converting an input frame of a predetermined number of pixels into a plurality of output frames, the spatial frequency spectrum of each of said plurality of output frames being that of a respective predetermined frequency band of the spatial frequency spectrum of the input frame, the apparatus comprising:

means for filtering the input frame in one direction so as to produce a first output frame of said predetermined number of pixels, the first output frame having only one of the high spatial frequencies and the low spatial frequencies of said input frame in said one direction;

means for subtracting said first output frame from said input frame so as to produce a second output frame of said predetermined number of pixels, the second output frame having the other of the high spatial frequencies and the low spatial frequencies of said input signal in said one direction;

means for filtering each of said first and second output frames in a direction perpendicular to said one direction so as to produce respectively third and fourth output frames of said predetermined number of pixels, the third and fourth output frames each having only one of the high spatial frequencies and the low spatial frequencies of said input frame in said perpendicular direction; and means for subtracting said third and fourth output frames from said first and second output frames respectively to produce fifth and sixth output frames of said predetermined number of pixels, the fifth and sixth output frames each having the other of the high spatial frequencies and the low spatial frequencies of said input signal in said perpendicular direction.

Thus, each of the output frames which is of full resolution may be filtered/processed without introducing any distortion other than that resulting directly from the processing. Furthermore, the steps of filtering and subtracting may be repeated for the output frame having both low horizontal and vertical frequencies to produce a series of logarithmically divided output frames. These may be processed separately and then recombined. Provided that sufficient numerical accuracy is maintained in the subtracter elements and there is no additional processing of the signals then simple addition of all the divided frames will perfectly reconstruct the original input signal.

Reference to the term "frame" is not limited to video frames formed of pairs of interlaced fields of data and equally applies to a single field of data or any other two dimensional array of image data.

BRIEF DESCRIPTION OF THE DRAWINGS

FIG. 7 illustrates another apparatus embodying the present invention;

FIG. 8 illustrates schematically the outputs of the apparatus of FIG. 7; and

DETAILED DESCRIPTION OF THE PREFERRED EMBODIMENTS

The present invention will be more clearly understood from the following description, given by way of example only, with reference to the accompanying drawings.

The following description is given for the division of an image between logarithmically determined frequency bands. However, it is also possible to use the present invention to produce images where the frequency bands are divided in some other way, for instance linearly.

Figure 1:
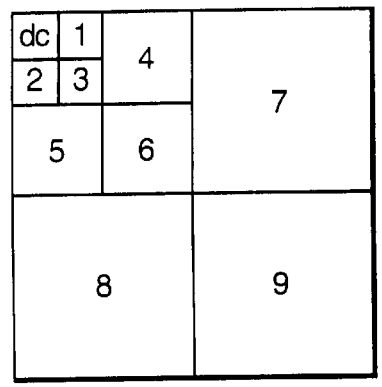
FIG. 1 illustrates an output frame divided into regions having the various frequency bands of an input image.
Figure 2:
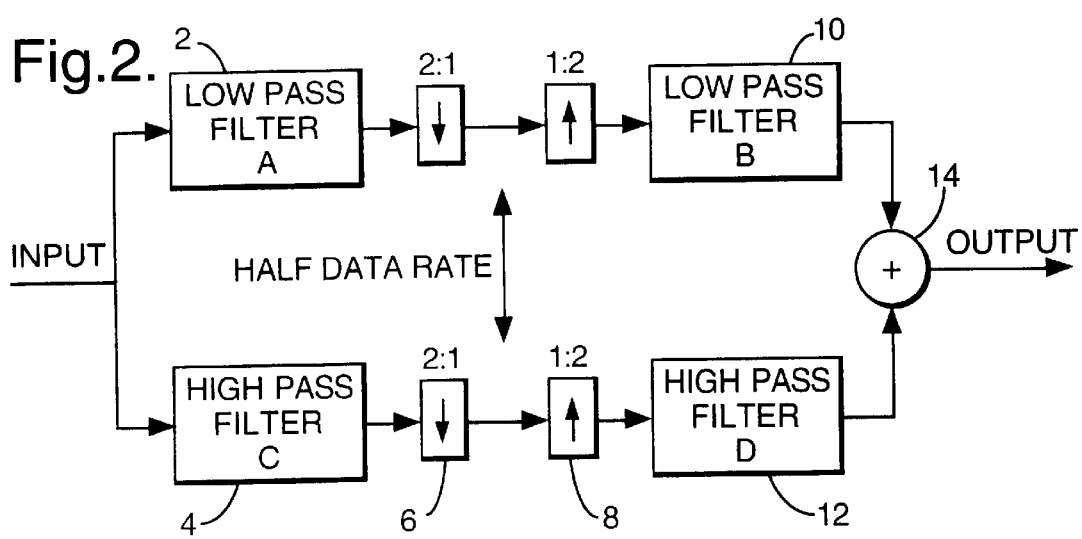
FIG. 2 illustrates an apparatus for dividing an input image between two frequency bands and reconstructing the input image.
Figure 3:
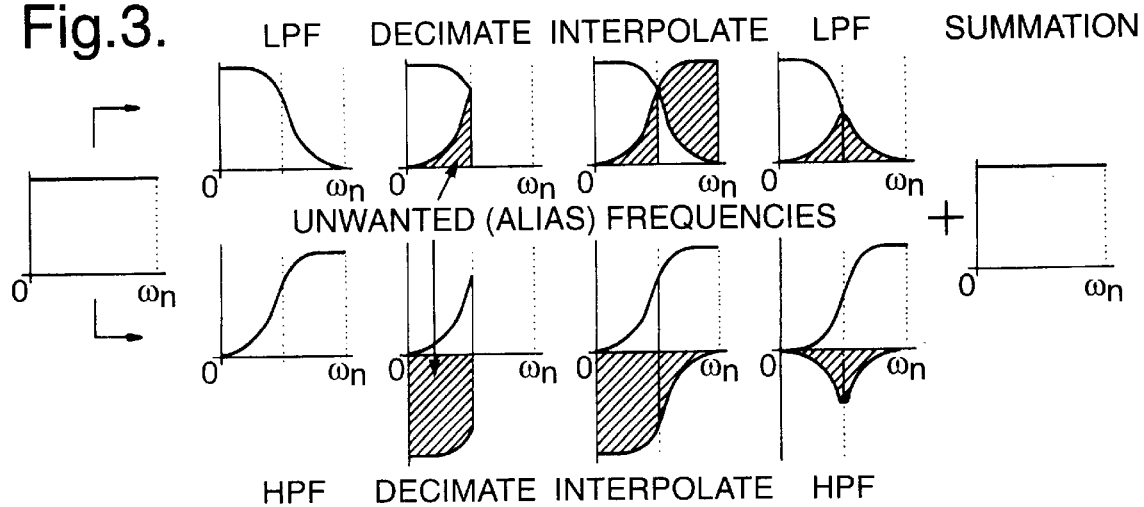
FIG. 3 illustrates the frequency spectrum at various stages of the apparatus of FIG. 2.
Figure 4A:
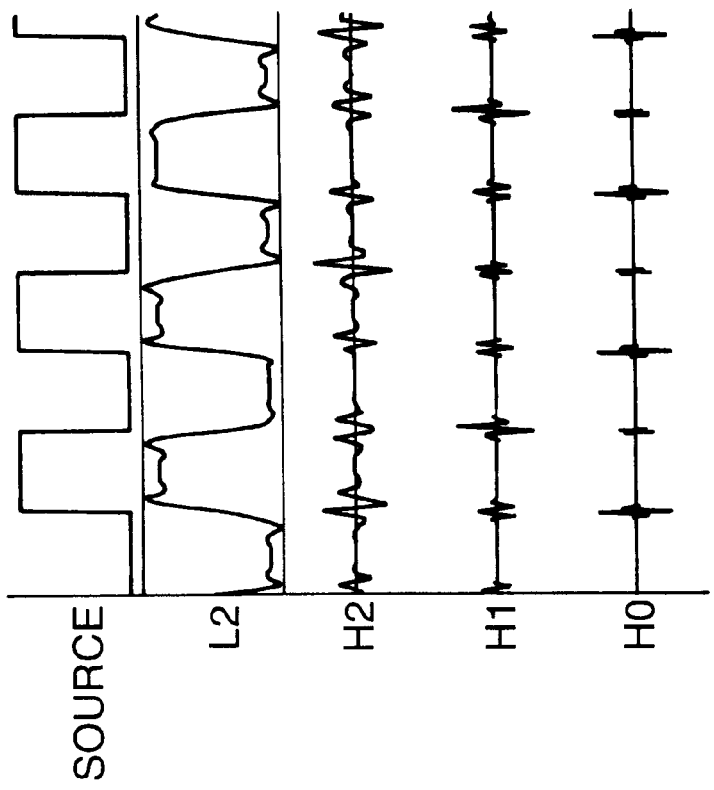
FIGS. 4a and 4b illustrate frequency components of a square wave after decimation by wavelet transformation.
Figure 4B:
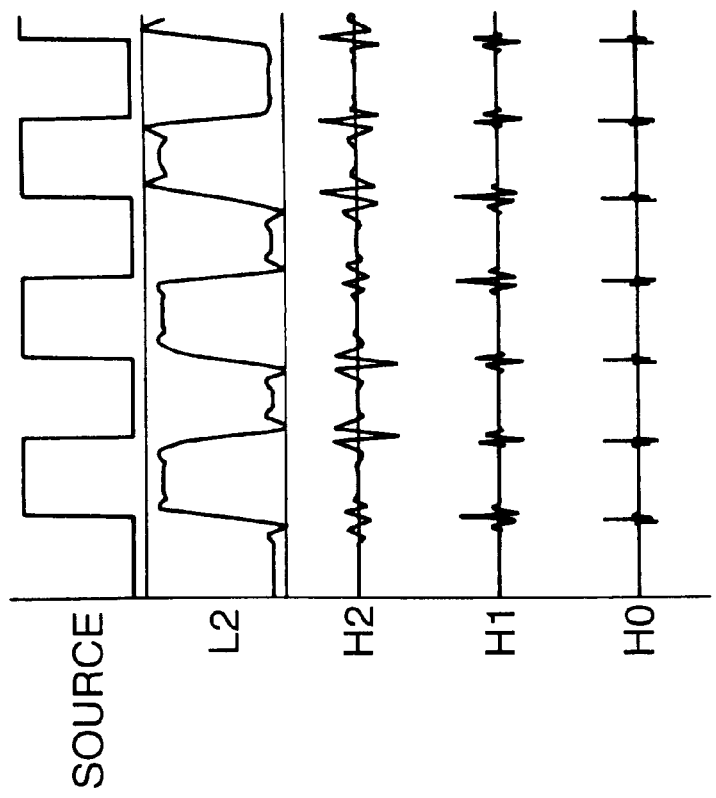
Figure 5:
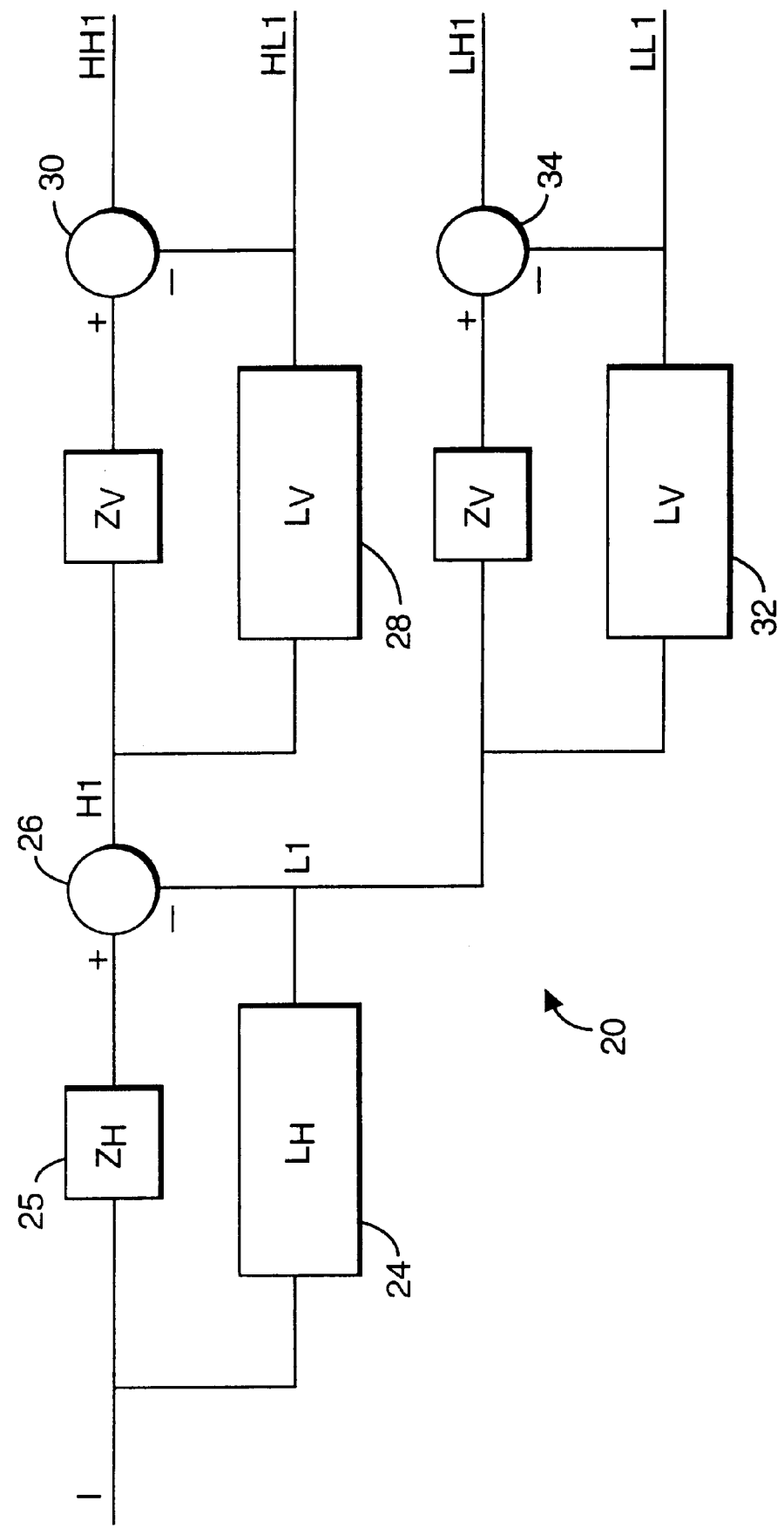
FIG. 5 illustrates an apparatus embodying the present invention.

FIG. 5 illustrates an apparatus 20 embodying the present invention. An input image signal I is filtered in a horizontal direction by a low pass filter 24 to produce a signal L1. Signal L1 is then subtracted from the input signal I by subtracter 26 to produce effectively a high pass filtered signal H1. These signals are illustrated, schematically in FIG. 6, noting that each of image signals L1 and H1 are full-resolution image signals like the input image signal.

Next, signal H1 is low pass filtered in a vertical direction by filter 28 to produce signal HL1 and this is subtracted by subtracter 30 from signal H1 to produce signal HH1. Also, signal L1 is low pass filtered in a vertical direction by filter 12 to produce signal LL1 and this is subtracted by subtracter 14 from signal L1 to produce signal LH1.

It will be noted that the apparatus of FIG. 5 also includes delays 25 which are used merely to compensate for the delays introduced by filters 24,28 and 32 so as to ensure the filtered signals are subtracted from the corresponding unfiltered signals.

Thus, from the source input image frame, four separate full-resolution frames are produced, LL1 having low frequency horizontal and vertical components, LH1 having low frequency horizontal components and high frequency vertical components, HL1 having high frequency horizontal components and low frequency vertical components and HH1 having high frequency horizontal and vertical components.

Clearly, although the apparatus of FIG. 5 is illustrated with two vertical low pass filters and associated subtracter, it is possible to use the same single vertical low pass filter alternately for each of the signals H1 and L1. Also, it is possible to reverse the processing, such that the signals are first vertically filtered and/or it is possible to high pass filter a signal and produce the low pass filtered signal by subtraction.

In order to further divide the signal in a logarithmic manner it is possible to further divide the signal LL1 having low frequency horizontal and vertical components.

Figure 6:
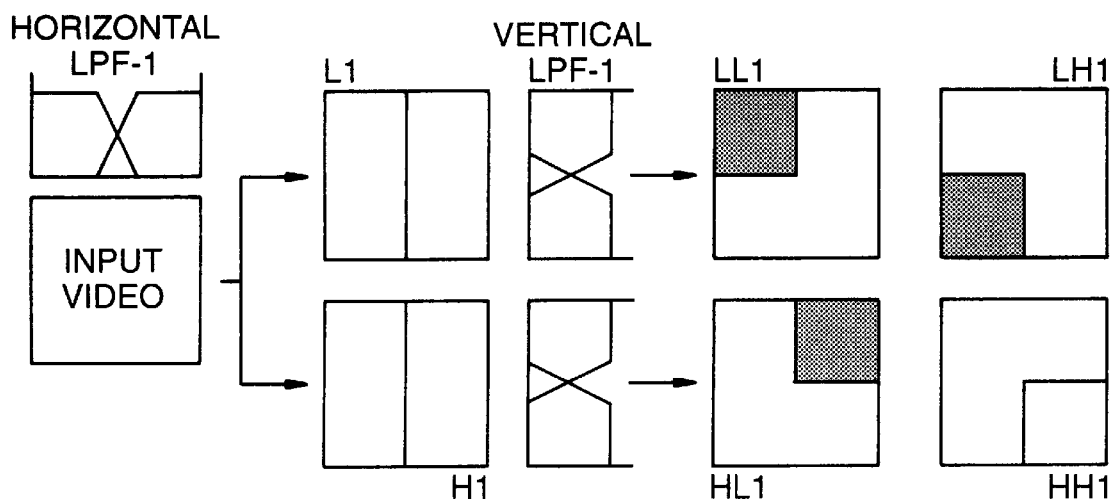
FIG. 6 illustrates schematically the process carried out by the apparatus of FIG. 5.

FIG. 7 illustrates how the apparatus 2 of FIG. 5 may be repeated to divide an input image frame into component frames as illustrated in FIG. 8 where, like FIG. 6, FIG. 8 illustrates the division of the input video frame schematically, since each sub-division illustrated contains the same number of pixels as the original input video signal.

In the case of FIG. 7, each apparatus 20 uses a different filter characteristic. Furthermore, delays 21 are preferably used so as to synchronize all of the outputs.

Figure 9:
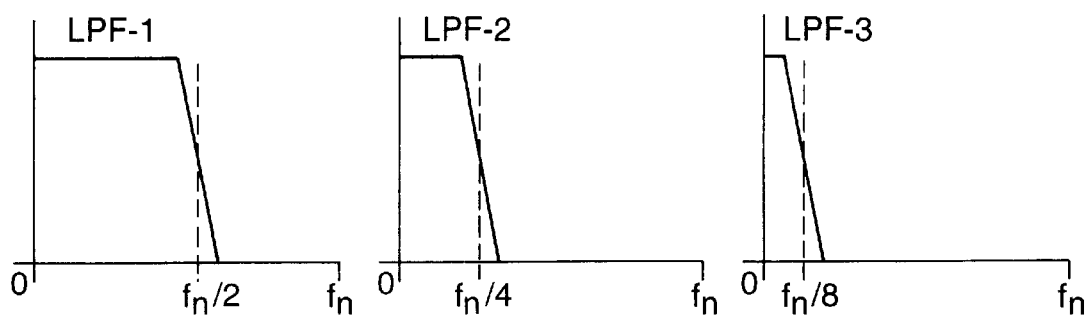
FIG. 9 illustrates preferable filter characteristics for use with the apparatus of FIG. 7.

FIG. 9 illustrates three filter characteristics, LPF-1, LPF-2 and LPF-3 for use in the three-stage division process of FIG. 7. LPF-1 has the highest frequency cut-off at half the Nyquist frequency, LPF-2 has a cut-off frequency equal to a quarter of the Nyquist frequency and LPF-3 has a cut-off frequency equal to an eighth of the Nyquist frequency.

Each filter characteristic is used in both the horizontal and the vertical directions. As illustrated, the relative rate of cut-off for LPF-3 is slower than that for LPF-2, which, in turn, is slower than that for LPF-1. This results from the need to keep the tap length of the filter LPF-3 at a respectively low level and also because experiments have suggested that lower frequency filters need to keep the filter ripples at a reduced level to reduce visible artifacts. This dictates a slower rate of filter cut-off as the filter cut-off frequency is reduced.

Clearly, although FIG. 7 illustrates a duplication of the apparatus 2 using different filter characteristics, it is possible to provide a system which uses the same apparatus 2 at each stage but merely changes the filter characteristic used by the apparatus. Indeed, FIG. 7 is only schematic when the invention is embodied by software.

Once the input signal has been divided as discussed above, it is then possible to process/filter individual component signals. In this way, the reconstructed input signal can be identical to the input signal in some frequency bands and modified as required in other frequency bands.

It is clear that the process of division is easily reversible with no signal loss provided that the signal accuracy is maintained.

With the ten filtered images represented in FIG. 8, a perfect reconstruction can be made of the original image by merely adding the filtered images together. Since the reconstruction back to the original image requires no interpolation, any changes in signal content, i.e. due to additional processing of the individual filtered images, do not spread any further than the area/frequencies immediately affected.

I claim:

1. A method of processing an input image by converting an input frame of a predetermined number of pixels into a plurality of output frames, the spatial frequency spectrum of each of said plurality of output frames being that of a respective predetermined frequency band of the spatial frequency spectrum of the input frame, the method comprising:

filtering the input frame in one direction so as to produce a first output frame of said predetermined number of pixels, the first output frame having only one of the high spatial frequencies and the low spatial frequencies of said input frame in said one direction;

subtracting said first output frame from said input frame so as to produce a second output frame of said predetermined number of pixels, the second output frame having the other of the high spatial frequencies and the low spatial frequencies of said input signal in said one direction;

filtering each of said first and second output frames in a direction perpendicular to said one direction so as to produce respectively third and fourth output frames of said predetermined number of pixels, the third and fourth output frames each having only one of the high spatial frequencies and the low spatial frequencies of said input frame in said perpendicular direction; and subtracting said third and fourth output frames from said first and second output frames respectively to produce fifth and sixth output frames of said predetermined number of pixels, the fifth and sixth output frames each having the other of the high spatial frequencies and the low spatial frequencies of said input signal in said perpendicular direction.

2. A method of processing an input image comprising:

repeating the method according to claim 1 using the output frame having the low spatial frequencies in said one and said perpendicular directions as the next input frame and using filtering with a lower cut-off frequency.

3. A method according to claim 1, wherein the filtering of at least one of the input frame, the first output frame, and the second output frame has a cut-off frequency of $2^{-n}$ times the Nyquist frequency of the input frame, where n is a positive integer.

4. A method according to claim 1, wherein the filtering of at least one of the input frame, the first output frame, and the second output frame is a low pass filtering.

5. A method according to claim 1, further comprising:

selectively processing and filtering a respective one or ones of the first to sixth output frames; and reconstructing a processed and filtered input frame by summing processed and filtered output frames.

6. A method according to claim 1, further comprising:

selectively processing or filtering respective one of the first to sixth output frames; and reconstructing a processed or filtered input frame by summing process or filtered output frame.

7. An apparatus for processing an input image by converting an input frame of a predetermined number of pixels into a plurality of output frames, the spatial frequency spectrum of each of said plurality of output frames being that of a respective predetermined frequency band of the spatial frequency spectrum of the input frame, the apparatus comprising:

means for filtering the input frame in one direction so as to produce a first output frame of said predetermined number of pixels, the first output frame having only one of the high spatial frequencies and the low spatial frequencies of said input frame in said one direction;

means for subtracting said first output frame from said input frame so as to produce a second output frame of said predetermined number of pixels, the second output frame having the other of the high spatial frequencies and the low spatial frequencies of said input signal in said one direction;

means for filtering each of said first and second output frames in a direction perpendicular to said one direction so as to produce respectively third and fourth output frames of said predetermined number of pixels, the third and fourth output frames each having only one of the high spatial frequencies and the low spatial frequencies of said input frame in said perpendicular direction; and means for subtracting said third and fourth output frames from said first and second output frames respectively to produce fifth and sixth output frames of said predetermined number of pixels, the fifth and sixth output frames each having the other of the high spatial frequencies and the low spatial frequencies of said input signal in said perpendicular direction.

8. An apparatus according to claim 7, further comprising:

means for providing the output frame having the low spatial frequencies in said one and said perpendicular directions as the input frame having means for filtering with a lower cut-off frequency.

9. An apparatus according to claim 7, wherein at least one of the means for filtering the input frame and the means for filtering each of said first and second output frames uses a cut-off frequency of $2^{-n}$ times the Nyquist frequency of the input frame, where n is a positive integer.

10. An apparatus according to any one of claims 7, wherein at least one of said means for filtering the input frame and the means for filtering each of said first and second output frames comprises a low pass filter.

11. An apparatus according to claim 7, further comprising:

means for selectively processing and filtering a respective one or ones of the first to sixth output frames; and means for reconstructing a processed and filtered input frame by summing processed and filtered output frames.

12. An apparatus according to claim 7, further comprising:

means for providing the output frame having the low spatial frequencies in said one and said perpendicular directions as the input frame having means for filtering with a lower cut-off frequency which uses a cut-off frequency of $2^{-n}$ times the Nyquist frequency of the input frame, where n is a positive integer.

13. An apparatus according to claim 7, further comprising:

means for selectively processing or filtering respective one of the first to sixth output frames; and means for reconstructing a processed or filtered input frame by summing processed or filtered output frames.

\* \* \* \* \*